(12) United States Patent
Endo et al.

(10) Patent No.: US 9,757,682 B2
(45) Date of Patent: Sep. 12, 2017

(54) PROCESS AND PLANT FOR REMOVING ACID GASES

(75) Inventors: Kohei Endo, Box Hill (AU); Geoffrey Stevens, Williamstown (AU); Barry Hooper, Melbourne (AU); Sandra Elizabeth Kentish, Kew East (AU); Clare Anderson, Brunswick West (AU)

(73) Assignee: UNO TECHNOLOGY PTY LTD (AU)

( * ) Notice: Subject to any disclaimer, the term of this patent is extended or adjusted under 35 U.S.C. 154(b) by 165 days.

(21) Appl. No.: 13/643,045

(22) PCT Filed: Apr. 21, 2011

(86) PCT No.: PCT/AU2011/000462
§ 371 (c)(1),
(2), (4) Date: Jan. 3, 2013

(87) PCT Pub. No.: WO2011/130796
PCT Pub. Date: Oct. 27, 2011

(65) Prior Publication Data
US 2013/0098126 A1    Apr. 25, 2013

Related U.S. Application Data

(60) Provisional application No. 61/345,901, filed on May 18, 2010.

(30) Foreign Application Priority Data

Apr. 23, 2010  (AU) .............................. 2010901733

(51) Int. Cl.
*B01D 53/04*   (2006.01)
*B01D 53/14*   (2006.01)
(Continued)

(52) U.S. Cl.
CPC ......... *B01D 53/1475* (2013.01); *B01D 53/60* (2013.01); *B01D 53/62* (2013.01);
(Continued)

(58) Field of Classification Search
None
See application file for complete search history.

(56) References Cited

U.S. PATENT DOCUMENTS 2,183,324 A * 12/1939 Reich ...................... C01B 31/20
188/78
2,997,366 A     8/1961 Owens et al.
(Continued)

FOREIGN PATENT DOCUMENTS

WO    WO 2008072979 A1 *  6/2008 ......... B01D 53/1475

OTHER PUBLICATIONS

Veewab et al., "Solvent Formulation for CO2 Separation from Flue Gas Streams", University of Regina, Department of Energy Publications, 2001 Conference Proceedings, Session 2B. Capture & Separation II—Improved Processes.*
(Continued)

*Primary Examiner* — Anita Nassiri Motlagh
(74) *Attorney, Agent, or Firm* — Merchant & Gould P.C.

(57) ABSTRACT

The present invention relates to a process and plant for removing acid gases such as carbon dioxide, sulphur containing compounds and nitrogen containing compounds from gas streams including high and low pressure gas streams. A solvent solution containing alkali carbonates absorbs the acid gases including carbon dioxide and either one or both of sulphur and/or nitrogen containing compounds. The bicarbonate is regenerated into a carbonate form to provide a gas stream rich in carbon dioxide, and sulphur and/or nitrogen containing compounds are recovered.

33 Claims, 5 Drawing Sheets

(51) Int. Cl.
    *B01D 53/60*     (2006.01)
    *B01D 53/96*     (2006.01)
    *B01D 53/62*     (2006.01)
    *B01D 53/78*     (2006.01)
    *B01D 53/80*     (2006.01)

(52) U.S. Cl.
    CPC ............ *B01D 53/78* (2013.01); *B01D 53/80* (2013.01); *B01D 53/96* (2013.01); *B01D 2251/30* (2013.01); *B01D 2251/606* (2013.01); *B01D 2257/302* (2013.01); *B01D 2257/404* (2013.01); *B01D 2257/504* (2013.01); *B01D 2258/0283* (2013.01); *Y02C 10/04* (2013.01)

(56) References Cited

U.S. PATENT DOCUMENTS

| | | | | |
|---|---|---|---|---|
| 3,879,521 | A * | 4/1975 | Anderson | 423/243.06 |
| 4,425,313 | A | 1/1984 | Cooper | |
| 4,510,124 | A * | 4/1985 | Sears et al. | 423/437.1 |
| 6,306,357 | B1 | 10/2001 | Simonson et al. | |
| 2006/0286011 | A1 * | 12/2006 | Anttila et al. | 422/168 |
| 2007/0221065 | A1 * | 9/2007 | Aroonwilas | B01D 53/14 96/243 |
| 2008/0250715 | A1 | 10/2008 | Cooper et al. | |
| 2008/0317651 | A1 * | 12/2008 | Hooper et al. | 423/230 |
| 2010/0011958 | A1 | 1/2010 | Cadours et al. | |
| 2010/0092359 | A1 * | 4/2010 | Svendsen et al. | 423/230 |
| 2010/0135881 | A1 * | 6/2010 | Zhou | B01D 53/1425 423/230 |

OTHER PUBLICATIONS

Gupta et al., "CO2 Capture Technologies and Opportunities in Canada: Strawman Document for CO2 capture and Storage (CC&S) Technology Roadmap", 1st Canadian CC&S Technology Roadmap Workshop, Sep. 18-19, 2003, Calgary, Alberta, Canada.*
Wikipedia Solubility Table.*
International Search Report for corresponding International Patent Application No. PCT/AU2011/000462 mailed Jul. 15, 2011.

* cited by examiner

PROCESS AND PLANT FOR REMOVING ACID GASES

FIELD OF THE INVENTION

The present invention relates to a process and plant for removing acid gases such as, but by no means limited to carbon dioxide, sulphur containing compounds and nitrogen containing compounds from a gas stream. The gas stream may be any gas stream such as flue gas of a coal fired power station.

BACKGROUND OF THE INVENTION

The concentration of carbon dioxide in the atmosphere has risen from 280 parts per million to 370 parts per million over the last 150 years. The higher concentration is largely attributable to intensive use of fossil fuels, particularly for electrical power generation and transportation. However, a rapid move to meet all energy needs through alternative renewable energy sources would be very costly to consumers, damaging to the economy, and at the present time is impractical on a technology basis.

A reduction in carbon dioxide emissions will be required to stabilize, and in the long term, decrease carbon dioxide concentrations in the atmosphere. A promising technology for significantly decreasing emissions from large scale carbon dioxide emitting plants such as coal fired power stations, cement plants, gas processing facilities and iron smelting plants involves separating carbon dioxide from the process streams and then storage or use of separated carbon dioxide in a manner that will prevent the carbon dioxide from being released to the atmosphere.

Technologies currently being used for separating carbon dioxide from gas streams include:
 physical solvents such as methanol and chemical solvents such as monoethanolamine (MEA) for absorbing carbon dioxide;
 various types of membranes for separating carbon dioxide from gases;
 adsorbing carbon dioxide onto zeolites and other solids; and
 low temperature separation.

Each of these technologies offer certain benefits or have particular disadvantages. It is an object of the present invention to provide an alternative for separating carbon dioxide from gas streams including, but by no means limited to flue gas streams.

SUMMARY OF THE INVENTION

Process

The present invention relates to a process for removing acid gases from a gas stream, the process includes the steps of:
 a) contacting the gas stream with a solvent solution stream containing alkali carbonate to absorb acid gases including carbon dioxide and either one or both of sulphur containing compounds or nitrogen containing compounds to form a loaded solvent stream including alkali bicarbonate and sulphur and/or nitrogen containing compounds and a second gas stream that is lean in acid gases;
 b) treating the loaded stream so as to regenerate alkali bicarbonate and form i) a regenerated stream containing alkali carbonate, ii) a gas stream that is rich in carbon dioxide and, iii) an intermediate stream that is lean in bicarbonate and contains sulphur and/or nitrogen compounds in solution;
 c) recovering from the intermediate stream either one or both of sulphur containing compounds or nitrogen containing compounds to form a lean stream; and
 d) recycling the regenerated stream of alkali carbonate and the lean stream for reuse in the solvent solution of step a).

It will be appreciated that the process may be carried out with, or without, the use of a promoter, activator or catalyst that enhances the absorption of acid gases including carbon dioxide into the solvent solution and/or the regeneration of the alkali bicarbonate.

Throughout this specification the term "acid gases" embraces any gas that can be act as an acid and can, for instance donate protons or be reduced. Examples of acid gases include, carbon dioxide, hydrosulphites, hydrogen sulphide, any sulphur or nitrogen containing compounds such as $SO_x$ and $NO_x$ where "x" has any value, and suitably any value up to 4 including values less than 1. One of the advantages of the present invention is that conventional purification techniques for the dedicated separation of either sulphur containing compounds and nitrogen containing compounds from gas streams, such as flue gas desulphurisation (FGD) and de NOx processes may not be necessary on new plants, or at least, do not need to be upgraded on existing plants. Moreover, dedicated separation techniques on existing plants may well become redundant and decommissioned.

In an embodiment, step d) includes recycling the lean stream formed in step c) for reuse in the solvent solution stream of step a).

In an embodiment, step b) includes heating the alkali bicarbonate for regeneration into alkali carbonate.

In an embodiment, the step b) includes regenerating the alkali bicarbonate by volatilizing carbon dioxide from dissolved alkali bicarbonate to form dissolved alkali carbonate. This embodiment may be carried out without the precipitation of the alkali bicarbonate before regeneration to alkali carbonate. In this situation, the intermediate stream may be formed according to step c) by utilising the regenerated alkali carbonate which will contain dissolved sulphur and nitrogen containing compounds from the loaded stream. In other words, the regenerated stream may also include sulphur and/or nitrogen containing compounds.

Moreover, the precipitation of bicarbonate can be avoided or minimised by not cooling the loaded stream prior to regeneration.

In an alternative embodiment, the process includes forming a slurry by precipitating from the loaded stream a precipitant including alkali bicarbonate and a liquid phase having (in solution) either one or both of sulphur containing compounds or nitrogen containing compounds.

Precipitating alkali bicarbonate may be carried out with or without conditioning of the loaded stream.

Conditioning may, for example, include cooling the solvent solution in a cooler, and/or adding precipitation crystals.

In an embodiment, the process includes transferring heat from the regenerated stream to the loaded stream so as to heat the loaded stream that is being treated according to step b) and cool the intermediate stream prior to reuse as the solvent solution according to step a).

The process can be operated so that the actual conversion of carbonate to bicarbonate during step a) will be any conversion i.e., loading up to 100%. The conversion will depend on a range of parameters used to design an absorber for a given inlet gas stream such as composition, flowrate, solvent concentration, temperature and operating pressure.

In an embodiment, precipitation of alkali bicarbonate may occur at least to some extent during step a). For example, alkali bicarbonate may precipitate to some extent in a contactor in which the solvent solution and gas stream contact according to step a).

In an embodiment, precipitation of alkali bicarbonate is completed during contacting step a). In other words, the precipitation of alkali bicarbonate is completed in the contactor in which step a) is occurring.

In an embodiment, precipitation of the alkali bicarbonate occurs separately from, or after, the absorption occurring during step a). For example, the precipitation may occur entirely outside of the contactor in which step a) is occurring.

In the situation in which at least some precipitation of alkali bicarbonate occurs (either during or after step a)), the precipitant may or may not be separated from the resulting slurry prior to regeneration according to step b).

In an embodiment, the precipitant is separated from a liquid phase lean in bicarbonate of the slurry and the precipitant fed to a regenerator for regeneration according to step b). It will be appreciated by those skilled in the art that the precipitant, although separated from the liquid phase, may be wet or include entrained solvent solution. In this situation, the intermediate stream may be formed according to step c) by mixing the liquid phase with the regenerated alkali carbonate.

In an embodiment, step a) is carried out in two or more contactor stages, and the method includes splitting the solvent solution stream into a plurality of solvent sub-streams and supplying the solvent sub-streams to each one of the respective contactor stages and conveying the gas stream successively through the contactor stages. In other words, the gas stream is conveyed in series through the contactor stages, and the solvent sub-streams are fed in parallel to the contactor stages.

In an embodiment, the solvent sub-streams and the gas stream may be either in counter current, co-current or a hybrid thereof in the contactor stages.

Absorption rates of the acid gases by the solvent solution increase as the temperature of the solvent solution increases. However, we have found that the heat of absorption of acid gas, particular the heat of absorption of carbon dioxide and the heat of precipitation of bicarbonate provide a temperature rise which, when step a) is performed in a single vessel, without careful temperature control, can detrimentally affect the amount of acid gas absorption due to temperature driven mass transfer effects. The use of multiple contactors, as described, provides a practical way of providing both inter-cooling, as may be required for step (a) and the general application of steps (a)-(d) including solids separation. The point at which it becomes preferable to conduct step a) in a plurality of contactor stages is a function of a numerous process and economic considerations including:

- the gas stream flow rate and the acid gas composition thereof including carbon dioxide, sulphur and/or nitrogen compounds;
- the desired recovery of acid gases from the gas stream; and
- the size of the contactor stages, supporting utilities and equipment, and associated capital and operating costs thereof.

In an embodiment, step a) is conducted in up to 5 contactor stages, suitably step a) may be carried out in 2, 3, 4 or 5 contactor stages. The solvent solution stream will be split into a corresponding number of the solvent sub-streams.

In an embodiment, the method includes conducting step a) such that the temperature of the solvent solution stream, or sub-streams, is less than or equal to the temperature at which the partial pressure of carbon dioxide of the sub-stream, is less than the partial pressure of carbon dioxide of the gas stream. In other words, step a) is conducted to maintain a driving force for absorption of carbon dioxide and/or other acid gases. We have realised that multiple contactor stages each fed with fresh sub-streams of solvent solution is preferable.

The process may include discharging side streams from at least one of the contactor stages, cooling the side stream and returning the cooled side stream to the same contactor stage. We have found that the feature of cooling the side stream is more practical in situations when no, or inconsequential amounts, of the bicarbonate are precipitated in the contactor stages.

In an embodiment, the process includes the loaded sub-streams forming slurry streams in one or more contactor stages, and preferably each of the contactor stages, the slurry including alkali bicarbonate solid phase and a liquid phase. The liquid phase may have (in solution) either one or both of sulphur containing compounds or nitrogen containing compounds.

In an embodiment, the process includes precipitating alkali bicarbonate from the loaded sub-streams that are discharged from each of the contactor stages. The step of precipitating alkali bicarbonate may include cooling each sub-stream in a dedicated cooler and/or adding a crystallising agent.

In the embodiment, the precipitant is separated from the liquid phase of each loaded sub-stream in a separator. Suitably, the precipitant of each loaded sub-stream is separated in dedicated separators for each sub-stream. An advantage we have found in the separating the precipitant on a sub-stream by sub-stream basis is that a higher separation efficiency of acid gas can be expected as well as resulting in less entrained liquid phase in the precipitant to the regenerator which reduces regenerator energy usage.

The sub-streams of two or more contactor stages, and possibly each of the sub-stream from the contactor stages, may be mixed together to form a combined loaded stream. Precipitant may be further crystallized from the combined loaded stream by cooling and/or by adding a crystallising agent to form a combined precipitant and liquid phase. The precipitant may then be separated.

In the situation in which the process includes a promoter, activator or catalyst a number of cases exist. When the promoter is both thermally sensitive to degradation and wholly or substantially soluble in the liquid solvent, it may be desirable to form a precipitate and separate the precipitant from the liquid phase for feeding the precipitant to the regenerator. This embodiment avoids the possibility of the promoter, activator or catalyst dissolved in the solvent solution and separate from the precipitant from potentially decomposing during regeneration of the precipitant during step b). As mentioned above, the precipitant may contain entrained liquid phase which may be exposed to decomposition during, decomposition of the precipitant.

Conversely, in the situation in which the process does not include the use of a promoter, activator or catalyst dissolved in the solvent solution or the promoter is less sensitive to thermal degradation or is prone to co-precipitate with the solid bi-carbonate, the process has the advantage of not necessitating separation of the precipitant from the liquid phase to facilitate regeneration of the precipitant. Accordingly, in another embodiment, the precipitant is retained in the slurry form, or a condensed slurry form, and the slurry is fed to the regenerator in which the alkali bicarbonate is regenerated to alkali carbonate according to step b). As indicated, this embodiment is particularly beneficial when the process is carried out without a promoter, activator or catalyst. However, if the process is carried out with a promoter, activator or catalyst, ideally it is one that is less sensitive to temperature degradation.

The decisions of whether or not to incorporate the slurry separation device depend on a number of design factors including, but not limited to:

whether or not a promoter is used;
the promoter used;
the physical characteristics of the promoter; and
the separation benefits from doing so both in acid gas absorption performance and regeneration energy usage.

The precipitant may be regenerated by heating to convert alkali bicarbonate to alkali carbonate and, forming the gas stream rich in carbon dioxide. The regenerating step may be carried out using any heat source. For example, the heat source may be surplus heat of a coal fired power station, and in this example, the heat source may be steam withdrawn from the stages of the power generating turbines or boiler house. However, in order not to interrupt the normal and optimal operating procedures of a power plant, suitably an auxiliary heating source is used for heating and regenerating the bicarbonate. For example, the auxiliary heating source may involve the combustion of fossil fuels and in this situation, any flue gas produced by the auxiliary heating source may be recycled to form part of the gas stream contacted with the solvent in step a). This feature is particularly relevant and important to the solvents in this invention as the low volatility of the carbonate solvents removes potential limitations of temperature that may impact alternative solvents being considered. This is particularly relevant in the embodiment where no promoter or catalyst, or for those which are insensitive to thermal degradation, is used because these compounds are generally thermally sensitive and can break down to create corrosive by-products at high temperature.

The application of innovative heat integration techniques can limit the requirements for external heating but to supply the additional heat required this technique can greatly enhance the attractiveness of the capture process for all applications, particularly retrofits. In this case the additional heat source can be applied at higher thermal efficiency and by not drawing from the power cycle can limit the effective parasitic power entirely. Parasitic power losses are a major disincentive to the use of such capture plant and this feature will effectively reduce the cost of low emission electricity to the power producer through eliminating loss of electricity produced.

This feature can be applied to any power plant and provides increased flexibility for retrofit and new build options.

The process may also include storing bicarbonate precipitant prior to regeneration according to step b) either i) in a slurry form, or ii) when separated from the slurry as a solid form. When the bicarbonate precipitant is separated from the slurry as a solid form, suitably the precipitant is stored in stockpiles. Alternatively, the slurry or loaded solution may be stored in ponds. The process may also include regenerating the stored bicarbonate using surplus heat from a power station. For example, it is customary for the demand for electrical energy of a power plant to fluctuate significantly over the course of a day, and when the energy demand peaks or is within range of the maximum generating capacity of the power station, the process may include storing the bicarbonate, and suitably storing the bicarbonate in precipitant form rather than regenerating the bicarbonate according to step b) at this time. Conversely, when the energy demand troughs or there is surplus heat energy available from the power plant, suitably the process includes regenerating stored bicarbonate according to step b) by using the surplus heat from the power plant. In addition, when surplus heat energy is available, step b) may of course also include regenerating the bicarbonate that has not been stored and has, for example, recently been formed according to step a).

While this concept of storing loaded solvent has been described the advantage of this feature is that through storing as a solid the volume is dramatically reduced, greater than ten times. This greatly enhances the attractiveness of this feature.

A portion of the regenerated stream may be mixed with the liquid phase (separated from the precipitant) to form the intermediate stream including sulphur containing compounds or nitrogen containing compounds.

In an embodiment, step c) includes conditioning the intermediate stream by adjusting the oxidation potential of the liquid phase so as to oxidise sulphur compounds to sulphate.

In an embodiment, conditioning the intermediate stream includes adding an oxidant to the liquid phase. Suitably the oxidant may be any one or a combination of oxygen, an oxygen containing gas such as air, ozone or hydrogen peroxide.

In an embodiment, conditioning the intermediate stream according to step c) includes cooling the intermediate stream so as to precipitate sulphate containing compounds.

Although it is possible that any portion of the intermediate stream may be conditioned for precipitating sulphur containing compounds, in an embodiment up to 20% wt of the intermediate stream is conditioned in step c) and suitably up to 10% wt of the intermediate stream is conditioned in step c), and even more suitably only up to 5% wt of the intermediate stream is conditioned in step c). The remaining portion of the intermediate stream that is not conditioned according to step c) may be purified or treated as desired or, alternatively, fed to the absorber for combining with the solvent solution.

In an embodiment, step c) may include selectively precipitating sulphur containing compounds while substantially retaining the nitrogen containing compounds in solution.

In the situation in which the gas stream includes $NO_x$ or other nitrogen containing compounds, recovering according to step c) may be characterised by precipitating nitrogen containing compounds from the intermediate stream. In an embodiment, step c) may be carried so as to precipitate both nitrogen containing compounds and sulphur containing compounds either selectively or collectively.

In the situation in which the nitrogen containing compounds are retained in solution, the process may involve withdrawing a side stream, either continuously or discontinuously on an as need basis for purging nitrogen containing compounds dissolved in solvent solution from the process.

In an embodiment, step c) includes recovering sulphur containing compounds and nitrogen containing compounds from the intermediate stream solution using any suitable technique. For instance, in place of the precipitation techniques mentioned above, it is possible that sulphur containing compounds and nitrogen containing compounds may be separately and/or collectively sorbed from the solution by ion exchange including the use of ion exchange resins.

In other words, step c) may include recovering sulphur containing compounds or nitrogen containing compounds by precipitating either one or a combination thereof. The precipitation of sulphur containing compounds and nitrogen containing compounds may be conducted separately or in a combination. Step c) may also include recovering sulphur containing compounds or nitrogen containing compounds by sorbing either one or a combination thereof, for example by ion exchange. The sorption of sulphur containing compounds or nitrogen containing compounds may occur separately of each other or in combination. In addition, step c) may include recovering either one of sulphur containing compounds or nitrogen containing compounds by precipitation, while recovering the other by sorption techniques.

In addition to the above, the process may include utilising the sulphur containing compounds and/or the nitrogen containing compounds recovered in step c) to produce a valuable product, such as an agricultural fertilizer.

In an embodiment, the process is characterised in that it is carried out without a promoter, activator or catalyst being added to the contacting step or any other step of the process.

The terms promoter, activator or catalyst refer to any material capable of enhancing the rate of the sorption of acid gases by the liquid solvent or enhance the rate of the regeneration of the bicarbonate to carbonate. Examples of promoters, activators or catalysts that may be included or excluded as desired, depending on the situation, may contain amines and amino acids, or mixtures thereof. Particular examples of promoters or catalysts suitable for enhancing the rate of absorption of at least carbon dioxide include piperazine, piperazine, N-2-hydroxyethypiperazine, N-(hydroxypropyl)piperazine Diethanol triamine (DETA), 2-((2-aminoethyl)amino)ethanol (AEEA), monoethanolamone (MEA), diethanolamine (DEA), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 2-amino-2-methylropanol (AMP), 1-amino-2-propanol (MIPA), 2-methyl-methanolamine (MMEA), piperidine (PE) or mixtures thereof. Alternatively, the rate promotion effect may be achieved by addition of a species known to catalyse the $CO_2$ hydration reaction. Examples of these are: arsenite, hypochlorite, sulphite or the enzyme carbonic anhydrase. The promoter or catalyst can also be selected form the group comprising glycine, sarcosine, alanine N-secondary butyl glycine and pipecolinic acid.

An example of a promoter, activator or catalyst that is more temperature stable and less prone to temperature degradation is boric acid or borates.

In an embodiment, the solvent solution contacting the gas stream has an alkali carbonate concentration greater than or equal to 30 wt %, and suitably ranging from 30 to 60 wt %, and even more suitably ranging from 35 to 50 wt % and still even more suitably 50 wt %.

The alkali of the alkali carbonate may be any form including sodium, potassium, lithium, etc. Any losses of alkali carbonate may be made up during the process. In the situation in which the alkali includes potassium, potassium carbonate and/or potassium hydroxide may be added to the process continuously or on a stage-wise basis. The additional make up potassium may be added at any step of the process, and suitably in a step to enhance operation, and particularly enhance precipitation of either one or both of bicarbonate or sulphur. For example, the make up may be added to the sulphur and nitrogen precipitation/removal steps.

In an embodiment, the overall loading of carbon dioxide either in loaded stream or in the precipitate solid is up to 0.75. Suitably, the overall loading of carbon dioxide ranges from 0.30 to 0.70 in the liquid stream (i.e., the liquid stream separated from the bicarbonate stream), and even more suitably ranges from 0.30 to 0.68 in the liquid stream.

Post Combustion or other Low Pressure Gas Streams

The contactor stage(s) in which step a) is occurring may be operated at any temperature that will maximise absorption. In the case where the gas stream is a post combustion gas stream, such as low pressure flue gas from a power station, the gas stream can be at high temperature but is likely to range from 50 to 80° C. and the temperature profile of a contactor and in which step a) is carried out ranges from 40 to 95° C. A benefit provided by this aspect is that the non-volatile and thermally stable solvent confers no constraint on the gas stream feed temperature providing one less constraint to the process designers. The solvent solution stream and the solvent sub-streams fed to the contactor stage(s) may have a temperature ranging from 40 to 90° C., and suitably from 50 to 60° C.

In an embodiment, where the flue gases are of a high temperature, a direct contact cooler with a re-circulating water stream may be included to manipulate the temperature and manage heat recovery from the overall process. Potassium make-up may best be done by dosing the circulating stream and in the process remove some or all of the sulphur and/or nitrogen compounds. Water that may condense from the flue gas stream is likely to produce a purge stream containing sulphur and/or nitrogen containing compounds. The purge stream can be treated by a range of thermal or physical processes to remove and/or concentrate the potassium compounds.

The high temperature flue gas may be any temperature, and may for example, be at least 70° C. and in the range of 70 to 240° C. The temperature of the gas stream discharged from the direct contact cooler may be in the range of 40 to 95° C., and suitably in the range of 50 to 80° C.

In an embodiment, step a) is carried out at any pressure including pressures ranging from 100 to 1000 kPa absolute, 100 to 500 kPa, 100 to 300 kPa, and suitably from 100 to 200 kPa, or from 100 kPa to 150 kPa absolute.

Regeneration of the bicarbonate in step b) may be carried out at any pressure ranging from 30 to 4500 kPa absolute, and suitably in the range 300 to 1100 kPa absolute.

The regeneration step will be performed at the temperature dictated by the lean loading required, operating pressure and wt % carbonate in the solvent. This temperature may range from 70 to 270° C.

Pre-combustion or other High Pressure Acid Gas Streams

In the case where the gas stream is a high pressure gas stream including, but not limited to, a pre-combustion gas stream such as a synthesis gas stream produced as the result of coal gasification or a natural gas stream, the temperature of the gas stream may vary widely. For example, the temperature of the gas stream may range from 40 to 700° C., suitably 40 to 600° C., even more suitably 40 to 400° C. The temperature of the lean solvent solution or the solvent sub-streams fed to the contactor stage(s) may have a starting temperature ranging from 80 to 250° C., and suitably ranging from 120 to 230° C.

In an embodiment, step a) can be carried out at a pressure ranging from 1,000 to 8,000 kPa absolute, and suitably at a pressure ranging from 2,500 to 6,500 kPa absolute.

In an embodiment, regenerating the bicarbonate according to step b) may be carried out at any pressure ranging from 100 kPa to 4500 kPa absolute, and suitably a pressure ranging from 300 to 4000 kPa absolute.

The regeneration step will be performed at the temperature dictated by the lean loading required, operating pressure and wt % carbonate in the solvent. This temperature may range from 100 to 270° C.

The present invention relates to a process for removing acid gases from a gas stream, the process includes the steps of:
a) contacting the gas stream with a solvent solution stream containing alkali carbonate to absorb acid gases including carbon dioxide and either one or both of sulphur containing compounds or nitrogen containing compounds to form a loaded solvent stream including alkali bicarbonate and sulphur and/or nitrogen containing compounds and a second gas stream that is lean in acid gases;
b) treating the loaded stream so as to regenerate alkali bicarbonate to alkali carbonate and form i) an intermediate stream including regenerated alkali carbonate and sulphur and/or nitrogen containing compounds in solution, and ii) a gas stream that is rich in carbon dioxide;
c) recovering from a portion of the intermediate stream either one or both of sulphur containing compounds or nitrogen containing compounds to form a lean stream; and
d) recycling another portion of the intermediate stream from step b) for reuse in the solvent solution of step a).

The present invention also relates to a process for removing acid gases such as carbon dioxide from a gas stream, the process including the steps of:
a) contacting the gas stream with a solvent solution including alkali carbonate to absorb carbon dioxide from the gas stream and form a loaded stream including alkali bicarbonate and a second gas stream that is lean in carbon dioxide;
b) regenerating the alkali bicarbonate to alkali carbonate of the loaded stream and, in turn, form a third gas stream that is rich in carbon dioxide;
c) recycling the alkali carbonate regenerated in step d) to step a) for use in the solvent solution;
and wherein the process is carried out without a promoter, activator or catalyst that enhances the absorption of carbon dioxide into the solvent solution and/or the regeneration of the alkali bicarbonate.

In an embodiment, the process is characterised in that the gas stream contacting the solvent solution includes sulphur containing compounds and nitrogen containing compounds and both compounds are absorbed by the solvent solution.

The process described in the paragraph immediately above may also include any one or combination of the features of the different embodiments described in other passages of this specification. For instance, the process described in the paragraph immediately above may be characterised by:
the bicarbonate being retained in solution so that there is no precipitation, or only insignificant precipitation of bicarbonate, and the bicarbonate formed is regenerating while dissolved;
allowing bicarbonate to precipitate at least to some extent, or completely, wherein the precipitation may occur during and/or after step a);
separating, or not separating the precipitant from the slurry, and when the precipitant is separated, feeding the precipitant to a regenerator for step b), and when the precipitant is not separated, feeding the slurry including the precipitant to the regenerator for step b);
storing bicarbonate and regenerating the bicarbonate when depending the energy demands of a power station.

It is within the scope of the present that acid gases such as sulphur and nitrogen containing gases may be separated from the gas stream prior to separation of carbon dioxide according to the present invention. However, in the situation in which the gas stream also includes sulphur containing compounds and/or nitrogen containing compounds, in an embodiment step a) includes the solvent solution absorbing the sulphur containing compounds.

In an embodiment, the process includes treating the loaded stream so as to regenerate alkali bicarbonate to alkali carbonate while retaining sulphur and/or nitrogen containing compounds in solution so as to form i) an intermediate stream including compounds thereof, and ii) a gas stream that is rich in carbon dioxide.

In an embodiment, the process includes conditioning at least a portion of the intermediate stream to precipitate therefrom either one or both of sulphur containing compounds or nitrogen containing compounds to form a lean stream.

In an embodiment, the process includes recycling a portion of the intermediate stream from which sulphur containing compound or nitrogen containing compounds are not precipitated for use in the solvent solution.

In an embodiment, the process includes recycling the lean stream for use in the solvent solution.

Plant

The present invention also relates to a plant for removing acid gases from a gas stream, the plant including:
a contactor in which a solvent solution including an alkali carbonate contacts the gas stream so as deplete the gas stream of carbon dioxide and either one or both of sulphur containing compounds or nitrogen containing compounds to form i) a loaded stream including bicarbonate and dissolved sulphur and/or nitrogen compounds and ii) a second gas stream that is lean in acid gases;
a regenerator in which the alkali bicarbonate is regenerated to alkali carbonate to form and discharge a regenerated stream of alkali carbonate;
one or more unit operations that form an intermediate stream containing sulphur and/or nitrogen compounds in solution from either one or a combination of i) a liquid phase lean in bicarbonate that is separated from the loaded stream, ii) the regenerated stream;
an impurities separator that separates and recovers from the intermediate stream either one or both of sulphur containing compounds or nitrogen containing compounds to form a lean stream; and
a feeder that recycles the regenerated stream of alkali carbonate and the lean stream for reuse as the solvent solution in the contactor.

The plant may be operated with or without the precipitation of alkali bicarbonate. In addition, the plant may be operated with or without the use of the promoter, activator or catalyst to enhance the absorption of one or more acid gases.

In the situation in which alkali bicarbonate is precipitated, the plant may include a bicarbonate precipitator that receives the loaded stream in which a slurry is formed and a separator for separating a bicarbonate solid phase and liquid phase containing dissolved sulphur compounds and/or nitrogen compounds. The solid phase may then be fed to the regenerator and the liquid phase fed to a mixer for mixing with the regenerated alkali carbonate. The impurities separator may receive sulphur and/or nitrogen containing compounds from the liquid phase or a mixture of the liquid phase and the regenerated stream.

In the situation in which the alkali bicarbonate is retained in solution, the regenerated stream may include dissolved sulphur and/or nitrogen containing compounds. Accordingly, the impurities separator may receive and separate sulphur and/or nitrogen containing compounds from the regenerated stream.

In an embodiment, the impurities separator includes a feeding device for feeding an oxidant thereto for oxidising the sulphur and nitrogen. Suitably, the feeding device is configured for bubbling air through the slurry.

In an embodiment, impurities separator includes a cooler for cooling the intermediate stream.

In an embodiment, the impurities separator includes an ion exchange chamber for sorbing nitrogen and/or sulphur containing compounds.

In an embodiment, the contactor includes two or more contactor stages through which the gas stream is convey successively, and the solvent stream is split into separate sub-streams that are each supplied to one of the respective contactor stages.

The contactor may include any number of contactor stages, and suitably up to 5 contactor stages, and even more suitably 2, 3, 4 or 5 contactor stages. The solvent solution stream will be split into a corresponding number of the solvent sub-streams.

In an embodiment, each contactor stage has a dedicated cooler for crystallising bicarbonate and a solid/liquid separator for separating the solid phase.

In an embodiment, the plant includes a heat exchanger for transferring heat from the regenerated stream to the loaded stream prior to being regenerated in the regenerator.

The plant may also include suitable conduits and pumps for recycling the regenerated carbonate solution from the regenerator to the absorber, and for conveying the liquid phase from the second separator back to the absorber.

The plant of the present invention may also include any one or a combination of the features of the process described herein or of the embodiments described below with reference to the Figures.

BRIEF DESCRIPTION OF THE DRAWINGS

The present invention will now be described with reference to the Figures, of which:

Figure 5:
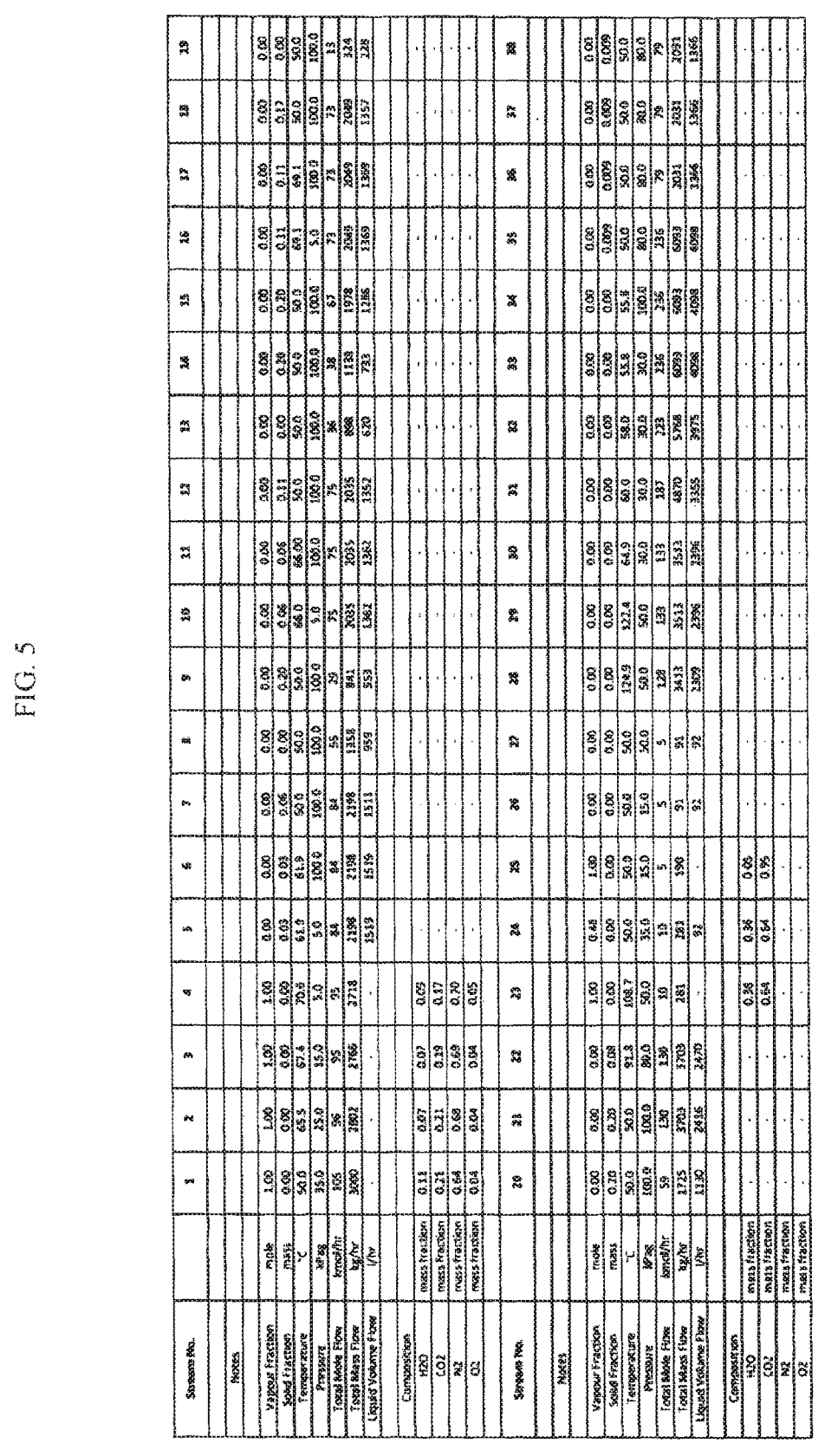

FIG. 5 comprises sample data including thermodynamic, flowrate and composition data for the process and plant shown in FIG. 3 for recovery of the acid gases from a post combustion gas stream using an alkali carbonate absorbent without a promoter or catalyst, the sample data has been generated by a computer package known as ASPEN which simulates chemical processes.

A description of Tables 1 to 6 is included in the text under the heading DETAILED DESCRIPTION.

DETAILED DESCRIPTION

The present invention is suitable for removing acid gases from gas streams of any scale, but is particularly suited for removing acid gases from large scale gas streams such as and without limitation, gas streams of fossil fuelled fired power stations such as post-combustion gas streams, cement plants, fossil fuel powered processing facilities including pre-combustion gas stream, gas streams of natural gas separating plants and iron smelting plants. In the case of a coal fired power plant, a flue gas can be in the order of 1250 ton per day (TPD).

Figure 1:
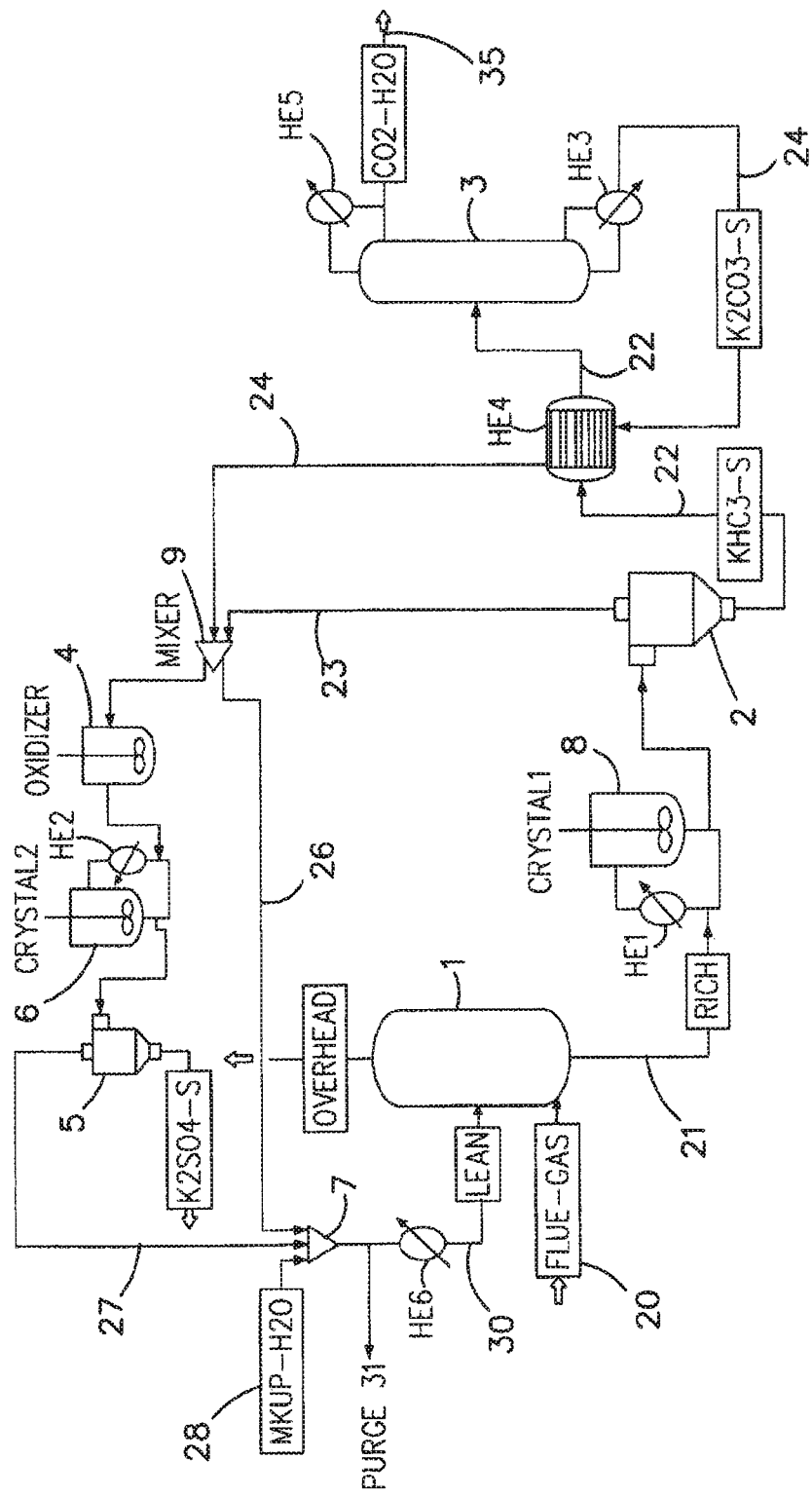
FIG. 1 is a flow diagram of a process and plant for removing acid gases from a gas stream in which alkali bicarbonate is precipitated prior to regeneration according to an embodiment.
Figure 2:
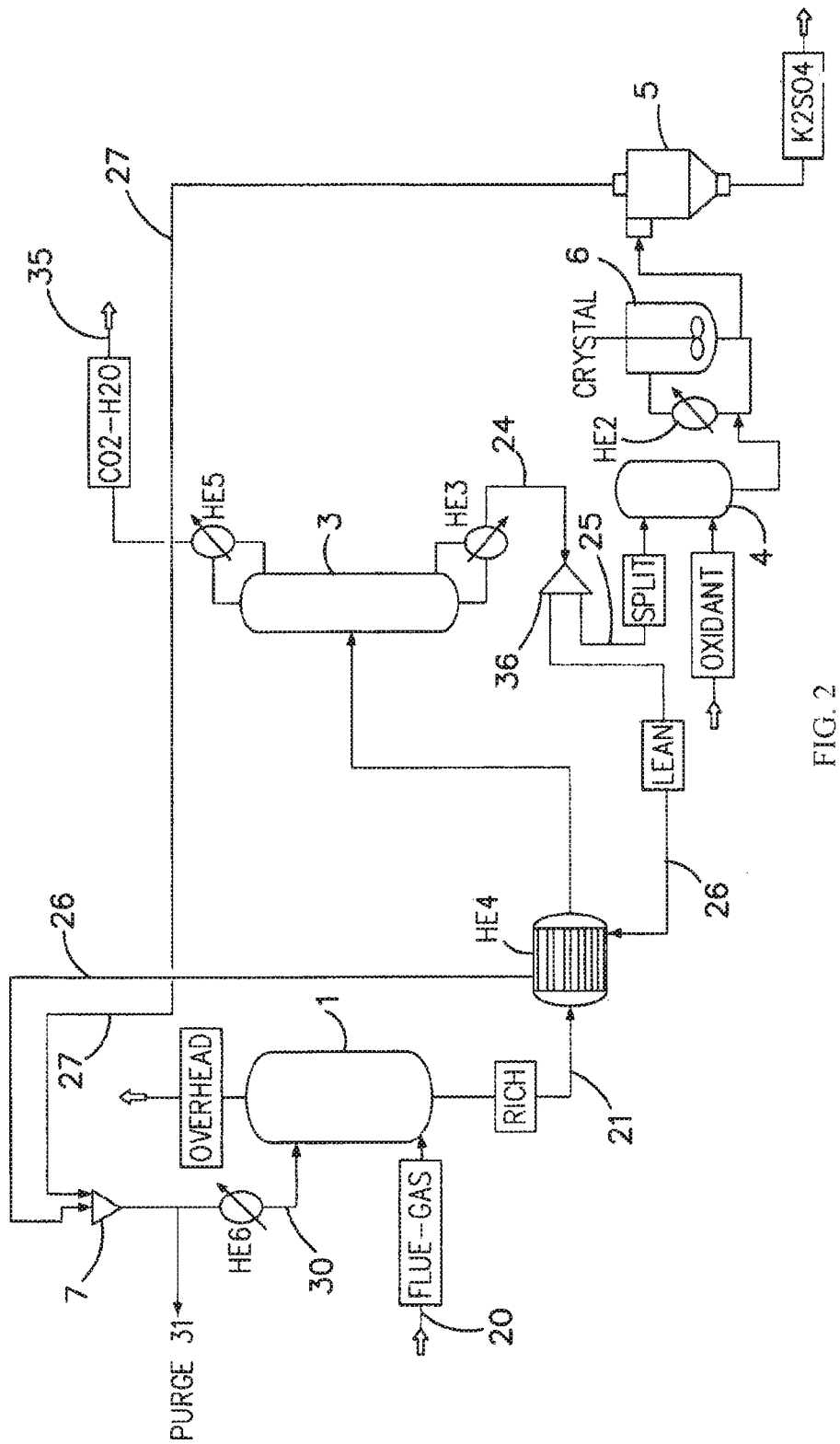
FIG. 2 is a flow diagram of a process and plant for removing acid gases from a gas stream in which alkali bicarbonate is essentially retained in solution for regeneration according to an alternative embodiment.

With reference to FIGS. 1 and 2, a post combustion gas stream 20 containing carbon dioxide, $SO_x$ and $NO_x$ is fed into a contactor or absorber vessel 1 and contacted with a alkali carbonate solvent solution 30 such as potassium carbonate. The precise composition of the gas stream will vary from application to application, and in the case of a coal fired power plant, flue gas stream may have an acid composition in the order of 13% $CO_2$ 227 ppm $SO_2$, 42 ppm $SO_3$, and 450 ppm $NO_x$ on a dry basis. Essentially all $SO_2$ and $SO_3$ will be absorbed by the solvent, only 10% of $NO_x$ is present as $NO_2$, of which 30% is absorbed, and the remainder is NO which is unreactive. Based on this type of gas stream composition, approximately 400 TPD of $CO_2$ and approximately 1200 kg/day of $K_2SO_4$ captured, and 50 kg/day of $KNO_3$ will be produced.

The contactor 1 may comprise any form of internal structures including trays and/or packing or open space to facilitate spray contact using sprays or foam matrix contacting methods and devices to maximise contact between the solvent solution and the gas stream.

In the case of the embodiment shown in FIG. 1, the contactor 1 is operated with a solid phase including $KHCO_3$ forming in the early stages in the $K_2CO_3$ solvent. This will have the effect of reducing the backpressure of $CO_2$ from the gas stream vented. One of the key points is that significantly higher loadings, and hence $CO_2$ holding capacity can be achieved in the solvent, and less energy is required to liberate $CO_2$ from solid phase including $KHCO_3$.

In contrast, in the case of the embodiment shown in FIG. 2, the contactor 1 will be operated substantially without a solid phase, and in which case $KHCO_3$ is substantially retained in solution throughout the process.

When the solvent solution has a $K_2CO_3$ concentration of 30 wt %, the required loading to begin $KHCO_3$ precipitation is 0.65 at 50° C. At these conditions the equilibrium partial pressure of $CO_2$ is roughly 13 kPa. The partial pressure of $CO_2$ in the flue gas is roughly 13 kPa.

The condition of 30 wt % and 50° C. can be thought of as the limit of feasible operation for the acid gas composition mentioned above. In order to move into steady state operating conditions there are a few adjustable operating parameters:

Increasing the wt % of alkali carbonate in the solvent solution (eg $K_2CO_3$) has the following consequences:

Decreases the loading at which $KHCO_3$ precipitation occurs.

Increases $CO_2$ holding capacity.

Decreasing the temperature of the alkali carbonate solvent solution has the following consequences:

Decreases the loading at which precipitation occurs

Decreases the equilibrium partial pressure of $CO_2$

Decreases absorption reaction kinetics.

Increasing the wt % is the preferred option, as hydrodynamic issues associated with high concentrations (and more with impurities) may be encountered in a slurry based process. The decrease in precipitation loading is significant and advantageous when looking at the driving force between equilibrium $pCO_2$ and flue gas $pCO_2$.

In contrast, decreasing absorber temperature below 50° C. may compromise absorption kinetics.

Table 1 below summarizes the back pressure of $CO_2$ over a given wt % of $K_2CO_3$ solution at saturation.

TABLE 1

| | Overall | | | Liquid Phase | |
|---|---|---|---|---|---|
| Loading | $K_2CO_3$ Wt % | Solid (%) | Loading | $K_2CO_3$ Wt % | pCO2 (kPa) |
| 0.4 | 40 | 4.0 | 0.35 | 38.4 | 1.94 |
| 0.5 | 40 | 8.3 | 0.41 | 36.4 | 2.96 |
| 0.6 | 40 | 12.3 | 0.48 | 34.4 | 4.75 |
| 0.7 | 40 | 16.3 | 0.57 | 32.3 | 8.25 |
| 0.75 | 40 | 18.1 | 0.62 | 31.1 | 11.33 |
| 0.8 | 40 | 20 | 0.68 | 30.0 | 16.35 |

In the case when the contactor 1 is operated at 50° C. and the solvent has a 40 wt % at the inlet, $CO_2$ is absorbed into the solution and surpasses a loading of 0.3, at which point the solution becomes supersaturated with respect to potassium bicarbonate. Assuming solid liquid equilibrium is reached in the contactor 1, Table 2 below provides resulting compositions at overall $CO_2$ loadings (i.e., bound as either solid or liquid).

TABLE 2

| Temperature (° C.) | $K_2CO_3$ Wt % | Loading limit | Eq-$pCO_2$ (kPa) | Driving force (kPa) |
|---|---|---|---|---|
| 40 | 30 | 0.53 | 4 | 9 |
| | 35 | 0.35 | 1 | 12 |
| | 40 | 0.21 | 0.5 | 12.5 |
| | 50 | 0.09 | 0.05 | 12.95 |
| 50 | 30 | 0.65 | 13 | 0 |
| | 35 | 0.45 | 4 | 9 |
| | 40 | 0.31 | 1.5 | 11.5 |
| | 50 | 0.13 | 0.2 | 12.8 |
| 60 | 35 | 0.56 | 12.5 | 0.5 |
| | 40 | 0.40 | 4 | 9 |
| | 50 | 0.19 | 0.7 | 12.3 |

The maximum overall loading for a 40% wt solution is in the region of 0.75 for the given operating conditions. At an overall loading of 0.8 the resulting liquid phase generates a partial pressure of $CO_2$ which is above $pCO_2$ of the inlet flue gas.

With reference to FIG. 1, the loaded stream 21 formed at the outlet of the contactor 1 may have any overall loading, but is suitably 0.75. The stream may be in the form of a slurry including bicarbonate solids or a solution without solids. Ideally at least some bicarbonate has begun to precipitate in the loaded stream 21.

The liquid phase of the lean stream 30 would have a $pCO_2$~2 kPa. Accordingly, it is envisaged that the lowest $pCO_2$ achievable in the outlet to the absorber flue gas stream is also ~2 kPa. This would limit the $CO_2$ absorption recovery to approximately 85% (in this example).

Precipitation of bicarbonate may occur entirely, partially or not at all in the contactor/absorber 1. If desired, the loaded stream 21 discharged from the contactor 1 may be treated to form a bicarbonate precipitant. As shown in FIG. 1, the treatment may involve cooling the loaded stream in a cooler, such as HE1, or adding crystallisation crystals in a crystallizer 8. Cooling/crystallizing of the slurry prior to solid/liquid separation reduces the loading of the resulting lean solvent stream that is fed back to the absorber 1, and increases the efficiency of $CO_2$ removal. If the rich solvent loading were decreased by controlling flow rates etc, the loading of the resulting lean solvent also decreases slightly, though not as significantly as reducing the crystallizer temperature.

The slurry is then fed to a first solid/liquid separator 2, in which the solid phase 22 including $KHCO_3$ is separated from the liquid phase 23. The liquid phase 23 includes sulphur and/or nitrogen containing compounds.

The solid phase 22 is fed to a heat exchanger HE4 in which heat is transferred from a regenerated stream 24 that is discharged from a regenerator 3 to the solid phase 22. The solid phase 22 is discharged from the heat exchanger HE4 at a preheated temperature and fed into the regenerator 3. The solid phase is a further heated in the regenerator, schematically depicted by heating means or reboiler HE3 for volatilising $CO_2$ from the solid phase and converting alkali bicarbonate back to alkali carbonate and water to form the regenerated stream 24. A stream rich in $CO_2$ 35 is discharged from the regenerator 3 and cooler in recuperative heat exchanger HE5 for storage or utilised as desired.

Set out below in Table 3 are results that show a typical relationship between temperature of the solvent solution and the overall $CO_2$ separation efficiency. The temperature of the solvent solution can be reduced by means of heat exchanger HE1 in FIG. 1

TABLE 3

Effect of rich solvent loading and crystallizer temperature for a 40% wt solution.

| Rich loaded stream at inlet to regenerator 3 | Crystallizer temperature (° C.) | $CO_2$ loading of lean stream fed to contactor 1 | Lean solvent backpressure ($CO_2$, kPa) | Percentage $CO_2$ removal efficiency |
|---|---|---|---|---|
| 0.5 | 50 | 0.348 | 1.7 | 87 |
| 0.6 | (no cooling) | 0.371 | 1.73 | 87 |
| 0.7 | | 0.399 | 1.94 | 85 |
| 0.75 | | 0.41 | 2 | 85 |
| | 40 | 0.343 | 1.7 | 87 |
| | 25 | 0.252 | 1 | 92 |

At a temperature of 50° C., the aqueous solubility of $K_2SO_3$ is 53 wt % and $KNO_2$ is 78 wt %, whereas the aqueous solubility limit of $KHCO_3$ is 35 wt %, $KNO_3$ is 46 wt % and $K_2CO_3$ is 55 wt %. This indicates that the -ite impurity forms are highly soluble and less likely to come out of solution with the bicarbonate.

The liquid phase 23 from the first solid/liquid separator 2 is combined with the regenerated stream 24 of alkali carbonate at mixer 9 and an intermediate stream 25 is split from the combined streams. The intermediate stream 25 is treated in a precipitator to precipitate sulphur and/or nitrogen containing compounds. The remaining portion of the combined stream that is not treated for precipitator i.e., recycle stream 26, is suitably mixed with the lean stream 27 discharge from the precipitator in mixer 7 and recycled back to the absorber 1. Make up water, and/or solvent, 28 may also be added to the process and suitably to the absorber as feed after being suitably temperature controlled in HE6. The ratio at which the combined stream is split into the intermediate stream 25 and the recycled stream 26 will vary, but suitably at least 75% of the combination is split into the recycled stream 26.

In the situation in which intermediate stream 25 of FIG. 1 constitutes approximately 10% of regenerated stream 24 and the process is operated at 40 wt % $K_2CO_3$ and with a $CO_2$ loading of 0.25 and a temperature of 50° C. entering the contactor 1, the intermediate stream, may for example have the following composition.

TABLE 4

| for a 40 wt % $K_2CO_3$ solution | |
|---|---|
| | Mass % |
| $H_2O$ | 56.5 |
| $K_2CO_3$ | 28.9 |
| $KHCO_3$ | 14.0 |
| $K_2SO_4$ | 0.6 |
| $KNO_3$ | <0.1 (trace) |

Although not shown in FIG. 1, it is possible that an amount of bicarbonate in solid phase may be mixed with the intermediate stream 25 to provide conditions that further favour the precipitation of sulphur and/or nitrogen containing compounds.

The intermediate stream is fed to a precipitator which includes an oxidizer vessel 4 having a feeding device for bubbling an oxidant such as air or any oxygen containing gas, or even ozone through the stream for oxidising sulphur to sulphate. The feeding device may be any manifold or sparging device. The oxidized intermediate stream 25 is fed to a crystalliser 6 including a cooler HE2 for cooling the stream to form a second slurry including sulphur and, optionally, a nitrogen containing precipitant. The precipitant is separated in solid/liquid separator 5 and the lean stream 27 discharged from the solid/liquid separator 5 is mixed in mixer 7 with the recycled stream 26.

In the case of the embodiment shown in FIG. 2, the bicarbonate component of the loaded stream 21 is retained in liquid phase only and the bicarbonate component is removed by volatilization of carbon dioxide therefrom in regenerator 3. Heat exchanger HE4 transfers heat from regenerated stream 24 as shown, from recycle stream 26, to the loaded stream 21 prior to the regenerator 3. The resulting regenerated stream 24 is lean in bicarbonate and includes dissolved sulphur and/or nitrogen containing compounds. The regenerated stream 24 is split into an intermediate stream 25 and a recycled stream 26 in splitter 36. The intermediate stream 26 is treated in the precipitator as described above in relation FIG. 1 and the lean stream combined with the recycle portion The precipitator includes an oxidizing vessel 4 having a feeding device for bubbling an oxidant such as air or any oxygen containing gas, or even ozone through the stream for oxidising sulphur to sulphate. The oxidized intermediate stream is then fed to a crystalliser 6 including a cooler HE2 for cooling the stream to form a second slurry including sulphur and/or containing precipitant. The precipitant is separated from a liquid phase in solid/liquid separator 5 to form the lean liquid stream 27. A lean stream 27 discharged from the solid/liquid separator is mixed at mixer 7 with the recycled stream 26 of the combined streams not treated in the precipitator as described above and possibly any makeup. This stream, after being suitably temperature controlled in HE6, is fed to the contactor 1.

In the situation in which intermediate stream 25 of FIG. 2 constitutes approximately 10% of regenerated stream 24 and the process is operated at 30 wt % $K_2CO_3$ and with a $CO_2$ loading of 0.20 and a temperature of 25° C. entering the contactor 1, the intermediate stream, may for example have the following composition.

TABLE 5

| for a 30 wt % $K_2CO_3$ solution | |
|---|---|
| | Mass % |
| $H_2O$ | 67.4 |
| $K_2CO_3$ | 23.4 |
| $KHCO_3$ | 8.5 |
| $K_2SO_4$ | 0.7 |
| $KNO_3$ | <0.1 (trace) |

With reference to the embodiments shown in both FIGS. 1 and 2, when the weight of carbonate in solution is in the range of 30 to 75%, the amount of nitrogen containing compounds in solution is low.

Control of nitrogen is possible in a variety of ways, including, but not limited to, purging from the recycled liquid (as in Stream 31), and other separation steps such as precipitation of nitrogen containing compounds in a third precipitator, ion exchange and membrane processes. To counter any loss arising from the purge stream or wetness of the sulphur containing solid phase, additional makeup solvent solution and or water may also be added on an as needed basis at any location in the flow sheet that benefits the operating performance.

Figure 3:
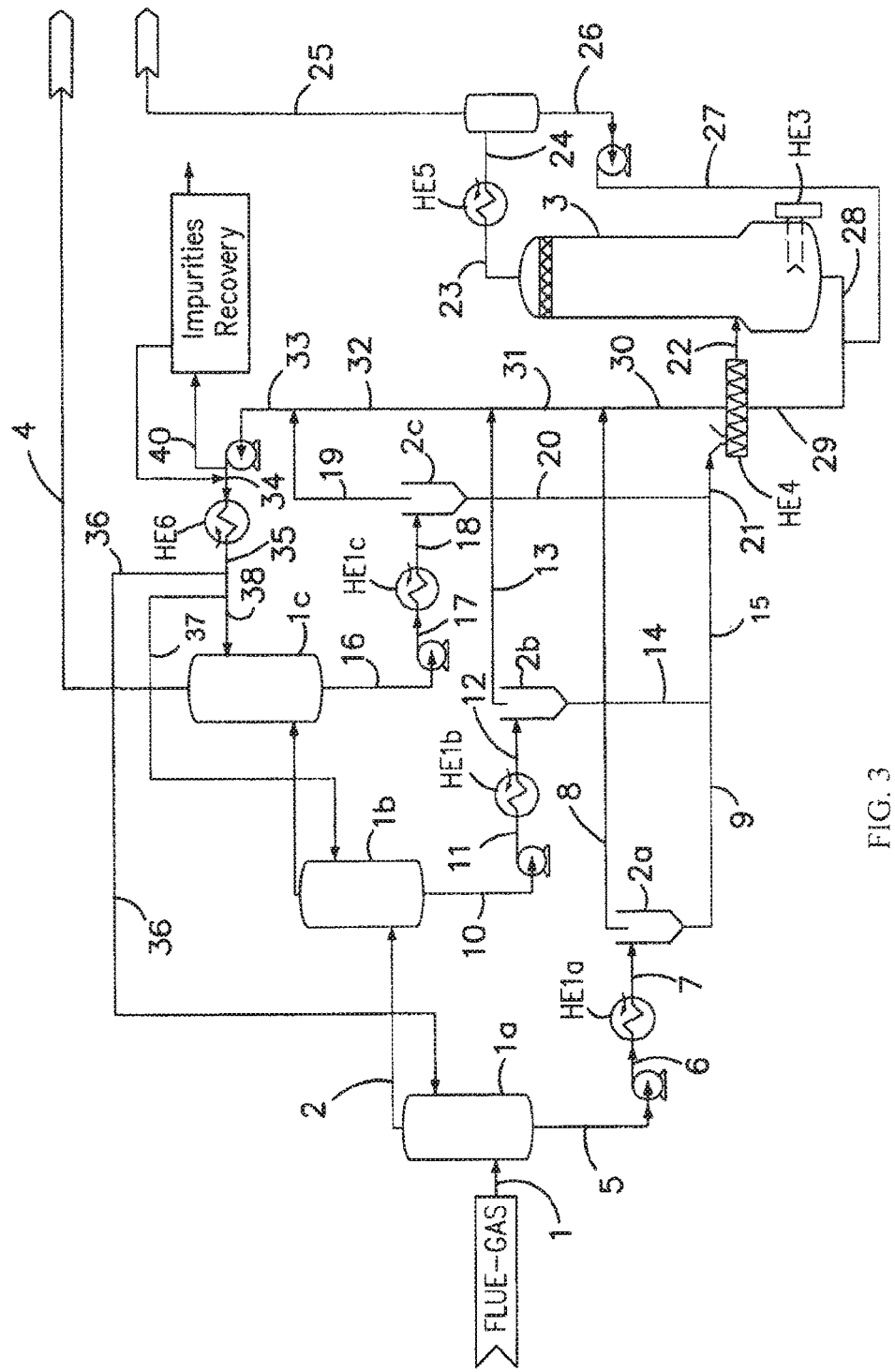
FIG. 3 is flow diagram of a process and plant for removing acid gases from a gas stream in which the gas stream is conveyed successively through three contactor stages and three solvent sub-streams are fed in parallel and discharged from the contactor stages according to a preferred embodiment.

FIG. 3 illustrates a preferred embodiment of the present invention and includes bicarbonate precipitation. The preferred embodiment is characterised by three contactor stages in which the gas stream 1 is conveyed successively i.e., in series from contactor stage 1a to 1b, and from 1b to 1c. The lean solvent solution stream 35 is split in three sub-streams 36, 37 and 38 which may have equal or different flowrates. The sub-streams 36, 37 and 38 are fed in parallel to their respective contactor stages i.e., sub-stream 36 is fed to contactor stage 1a and loaded stream 5 is discharged, sub-stream 37 is fed to contactor stage 1b and loaded stream 10 is discharged, and sub stream 38 to contactor stage 1c from which loaded stream 16 is discharged. The number of the contactor stages may be can varied depending on a number variables such as feed gas stream and solvent flowrates, and acid gas composition. As described above under the heading, SUMMARY OF THE INVENTION, dividing the absorption stage from one stage as shown in FIGS. 1 and 2, into multiple stages, as shown in FIG. 3, improves the absorption of acid gases in solution by reducing heat effects and altering the solution to improve mass transfer performance. The contactor stages may contact the gas stream and solvent in counter current flow, co-current flow or a hybrid thereof.

The solid fraction of loaded streams 5, 10 and 16 is 3 wt %, 6 wt % and 11 wt % respectively. The loaded streams are then cooled in coolers HE1a, HE1b and HE1c respectively, to reduce temperature and further crystallize alkali bicarbonate to form slurry streams 7, 12 and 18 respectively. The solid phase and liquid phase of the slurry streams 7, 12, and 18 are each separated in the solid/liquid separators 2a, 2b and 2c respectively. Streams 8, 13 and 19 discharged from the separators are lean in bicarbonate but contain dissolved sulphur and/or nitrogen containing compounds. The solid phases 9, 14 and 20 discharged from the solid/liquid separators 2a, 2b and 2c are fed to a heat exchanger HE4 and are heated therein by regenerated stream 29 discharged from the regenerator 3. Heat supplied by reboiler HE3 transforms alkali bicarbonate to alkali carbonate and produces gas stream 25 rich in carbon dioxide. Moisture in the gas stream may be condensed in condenser HE5 and mixed into the regenerated stream 28 via stream 27. The regenerated stream 29 transfers heat to the leaded stream 21 in heat exchanger HE4, and is the then mixed with lean streams 8, 13 and 19 discharged from the solid/liquid separators 2a, 2b and 2c to produce intermediate product stream 33. Prior to recycling the intermediate stream 33, a portion 40 of the intermediate stream may undergo an impurities recovery step when the gas stream 1 contains sulphur and nitrogen containing compounds.

Figure 4:
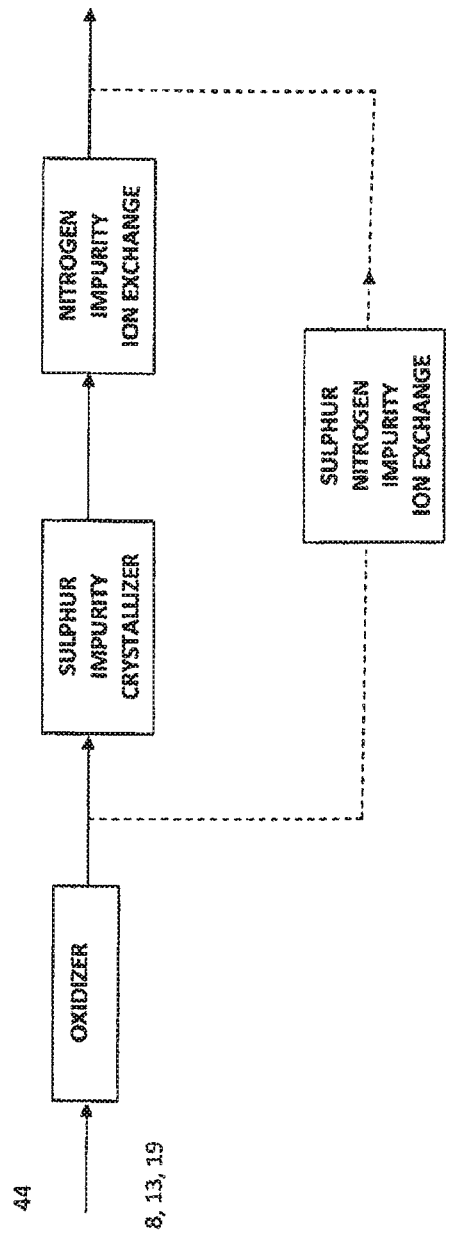
FIG. 4 is a block diagram of the steps for removing impurities such as sulphur and nitrogen containing compounds.

FIG. 4 illustrates is block diagram of some of the basic steps including i) oxidation to convert the sulphur and nitrogen compounds to an -ite or -ate form, ii) crystallisation of the sulphur compounds which are less soluble that the nitrogen compounds and iii) thereafter ion exchange recovery of the nitrogen compounds. Ion exchange could also be used for sulphur removal rather than precipitation.

It will be appreciated ion exchange may be used to recover both sulphur and nitrogen containing compounds and this is shown in FIG. 4 as a dashed line showing the alternative route.

As described above, some of the main benefits of the process and plant shown in FIGS. 3 and 4 include the following. Feeding fresh solvent sub-streams to multiple contactor stages and conveying the gas stream successively through the contactor stages minimises the impact of heat of absorption and heat of crystallisation. By reducing the temperature rise in each contactor, the partial pressure of carbon dioxide of the solvent solution is reduced which maintains the driving force for absorption.

Dedicated coolers and solid/liquid separators for each of the contactor stages enables greater acid gas separation efficiency to be achieved by both reducing liquid bi-carbonate levels without feeding to the regenerator and in feeding less water to the regenerator which lowers energy usage, and if used, less thermally sensitive promoter or catalyst may be fed to the regenerator resulting in lower degradation rates.

The heating source for the regenerator may be an external heating source, and suitably is a dedicated boiler that does not reduce the power generation capacity of power station that produces the gas stream. Moreover, the combustion products produced by the boiler may be combined with the gas stream feed to the contactor stages.

According to our simulations using ASPEN, the energy usage of the boiler reduces as the degree of bicarbonate precipitation increases. FIG. 2, is an example without precipitation, and the boiler for the regenerator has the highest energy load FIG. 1 includes some precipitation followed by FIG. 3 which has the highest degree of precipitation. Table 6 below provides a summary of the energy used for the respective reboilers in the same contacting area.

TABLE 6

| Case | Description | Energy usage for reboiler (MJ/kg of CO2 captured in concentrated gas stream) |
|---|---|---|
| 1 | Process of FIG. 2 without promoter | 4.88 |
| 2 | Process of FIG. 1 without promoter | 3.68 |
| 3 | Process of FIG. 3 without promoter | 3.57 |

It will be understood to persons skilled in the art of the invention that many modifications may be made without departing from the spirit and scope of the invention.

The claims defining the invention are as follows:

1. A process for removing acid gases from a gas stream, the process includes the steps of:
    a) contacting the gas stream with a solvent solution stream containing alkali carbonate at a concentration ranging from 30 to 60 wt % to absorb acid gases including carbon dioxide and either one or both of sulphur containing compounds or nitrogen containing compounds to form i) a loaded stream including alkali bicarbonate and sulphur and/or nitrogen containing compounds and ii) a second gas stream that is lean in acid gases, and wherein step a) is carried out in at least one contactor and includes precipitating the alkali bicarbonate to form a precipitant in the contactor so that the loaded stream includes the precipitant and a liquid phase including the solvent stream, and wherein step a) is carried out in the at least one contactor at a pressure ranging from 100 to 300 kPa;
    b) controlling the temperature at which step a) occurs in the contactor by cooling the loaded stream either in situ or by discharging a side stream of the loaded stream from the at least one contactor, cooling the side stream and returning the cooled side stream to the same contactor, such that step a) is carried out in the at least one contactor at an-isothermal temperature in the temperature range of 40 to 95° C, such that the heat of absorption of carbon dioxide and the heat of precipitation of bicarbonate do not affect the amount of acid gas absorption due to temperature effects on mass transfer, and wherein the isothermal temperature is selected based on the concentration of the alkali carbonate in the solvent stream and the required acid gas absorption;
    c) heating the loaded stream so as to regenerate alkali bicarbonate in the precipitant and the liquid phase and form i) a regenerated stream containing alkali carbonate, ii) a gas stream that is rich in carbon dioxide and iii) an intermediate stream that is lean in alkali bicarbonate and contains sulphur and/or nitrogen compounds in solution;
    d) recovering from the intermediate stream, that is rich in alkali carbonate, either one or both of sulphur containing compounds or nitrogen containing compounds to form a lean stream, wherein step d) includes recovering either one or a combination of sulphur containing compounds or nitrogen containing compounds by selective sorption using at least one ion exchange resin; and
    e) recycling a recycle stream that includes the regenerated stream of alkali carbonate and the lean stream for reuse in the solvent solution of step a), in which the recycle stream is lean in bicarbonate and has a carbon dioxide loading in the range of 0.2 to 0.3, wherein the liquid phase of the solvent stream has either one or both of sulphur containing compounds or nitrogen containing compounds and the liquid phase forms at least part of the intermediate stream lean in bicarbonate and from which either one or both the sulphur containing compounds or nitrogen containing compounds are recovered according to step d).

2. The process according to claim 1, wherein the process includes transferring heat from the regenerated stream to the loaded stream so as to heat the loaded stream that is being treated according to step c) and cool the regenerated alkali bicarbonate prior to reuse as the solvent solution according to step e).

3. The process according to claim 1, wherein step c) includes forming at least part or all of the intermediate stream from a split of the regenerated stream containing alkali carbonate.

4. The process according to claim 1, wherein step c) includes forming at least part or all of the intermediate stream from the liquid phase of the regenerated stream.

5. The process according to claim 1, wherein the alkali bicarbonate precipitant is separated from the slurry and fed to a regenerator for regeneration according to step c).

6. The process according to claim 1, wherein step a) and step c) is carried out in two or more contactor stages, and the process includes splitting the solvent solution stream into a plurality of solvent sub-streams and supplying the solvent sub-streams to each one of the respective contactor stages to form loaded sub-streams and conveying the gas stream successively through the contactor stages.

7. The process according to claim 6, wherein the process includes conducting step a) and step c) such that the temperature of the solvent solution stream, or sub-streams, is less than or equal to the temperature at which the partial pressure of carbon dioxide of the sub-stream, is less than the partial pressure of carbon dioxide of the gas stream.

8. The process according to claim 6, wherein step a) and step c) are conducted in up to 5 contactor stages and the solvent solution stream is split into a corresponding number of the solvent sub-streams.

9. The process according to claim 6, wherein the process includes the loaded sub-streams forming slurry streams in one or more contactor stages, in which the slurry includes a solid phase rich in alkali bicarbonate and a liquid phase lean in bicarbonate and containing varying amounts of either one or both of sulphur containing compounds or nitrogen containing compounds.

10. The process according to claim 6, wherein the solvent solution stream or substreams are conveyed in either counter current or co-current to the gas stream in at least one contactor stage.

11. The process according to claim 6, wherein the process includes precipitating alkali bicarbonate from the loaded sub-streams that are discharged from the contactor stages.

12. The process according to claim 11, wherein the step of precipitating alkali bicarbonate includes cooling each sub-stream in a dedicated cooler and/or adding a crystallising agent.

13. The process according to claim 9, wherein the precipitant is separated from the liquid phase of each loaded sub-stream in dedicated separators for each sub-stream.

14. The process according to claim 1, wherein the process is characterised by the use of a promoter, activator or catalyst for enhancing the absorption of acid gases and/or the regeneration of bicarbonate to carbonate.

15. The process according to claim 1, wherein the process is characterised by the use of a promoter, activator or catalyst, and the process includes forming a slurry by precipitating from the loaded stream a precipitant including alkali bicarbonate and a liquid phase having either one or both of sulphur containing compounds or nitrogen containing compounds, and the promoter, activator or catalyst is retained in the liquid phase and free from the precipitant which is treated according to step c).

16. The process according to claim 1, wherein the process is characterised by being without a promoter, activator or catalyst.

17. The process according to claim 1, wherein step c) includes heating the alkali bicarbonate using an auxiliary heating source that is separate from power plant operations, the auxiliary heating source involving the combustion of fossil fuels, and flue gas produced by the auxiliary heating source forms a part of the gas stream contacted with the solvent in step a).

18. The process according to claim 1, wherein the process includes storing bicarbonate precipitant prior to regeneration according to step c) either i) in a slurry form, or ii) when separated from the slurry as a solid form.

19. The process according to claim 18, wherein the process includes storing the bicarbonate in precipitant form during periods of high demand for electrical energy and regenerating stored bicarbonate according to step c) by using the surplus heat from a power plant during period of lower demand for electrical energy or when there is surplus heat energy is available.

20. The process according to claim 1, wherein step d) includes conditioning the intermediate stream by adjusting the oxidation potential of the liquid phase by adding a oxidant so as to oxidise either one or a combination of sulphur containing compounds and or nitrogen containing compounds.

21. The process according to claim 20, wherein up to 20% wt of the intermediate stream is conditioned in step d).

22. The process according to claim 20, wherein up to 5% wt of the intermediate stream is conditioned in step d).

23. The process according to claim 1, wherein step d) includes recovering the sulphur containing compounds by precipitation and recovering the nitrogen containing compounds by sorption.

24. The process according to claim 1, wherein both sulphur containing compounds and nitrogen containing compounds are recovered concurrently in a combined sorption step, or alternatively separately, in which sulphur containing compounds are sorbed in one sorption step and recovered, and nitrogen containing compounds are sorbed in a second sorption step and recovered.

25. The process according to claim 1, wherein the overall loading of carbon dioxide either in loaded stream or in the precipitant is up to 0.75 moles of carbon dioxide per mole of alkali carbonate.

26. The process according to claim 1, wherein the overall loading of carbon dioxide ranges from 0.30 to 0.70 moles of carbon dioxide per mole of alkali carbonate in the loaded stream.

27. The process according to claim 1, wherein the gas stream is a low pressure gas stream and of high temperature such that cooling is required prior to step a) and said cooling is done by a direct contact cooler with re-circulating water.

28. The process according to claim 27, wherein the re-circulating water stream is dosed with a potassium compound as makeup such that sulphur and/or nitrogen compounds are removed in a purge stream as potassium salts.

29. The process according to claim 28, wherein the potassium compounds are removed from the purge stream by any of a number of thermal and/or physical processes to produce concentrated potassium by-products.

30. The process according to claim 1, wherein regeneration of the bicarbonate in step c) is carried out at a pressure ranging from 30 to 1100 kPa absolute.

31. The process according to claim 1, wherein regeneration of the bicarbonate in step c) is carried out at a temperature ranging from 70 to 270° C.

32. The process according to claim 1, wherein the process includes utilising the sulphur containing compounds and/or the nitrogen containing compounds recovered in step d) to produce an agricultural fertilizer.

33. A process for removing acid gases from a gas stream, the process includes the steps of:
- a) contacting the gas stream with a solvent solution stream containing alkali carbonate at a concentration ranging from 30 to 60 wt % to absorb acid gases including carbon dioxide and either one or both of sulphur containing compounds or nitrogen containing compounds to form a loaded solvent stream including alkali bicarbonate and sulphur and/or nitrogen containing compounds and a second gas stream that is lean in acid gases, wherein step a) is carried out in at least one contactor, and includes precipitating the alkali bicarbonate to form a precipitant in the contactor so that the loaded stream includes the precipitant and a liquid phase including the solvent solution, and wherein step a) is carried out in the at least one contactor at a pressure ranging from 100 to 300 kPa;
- b) controlling the temperature at which step a) occurs in the contactor in situ or by discharging a side stream of the loaded stream from the at least one contactor, cooling the side stream and returning the cooled side stream to the same contactor, such that step a) is carried out in the at least one contactor at an isothermal temperature in the temperature range of 40 to 95° C, such that the heat of absorption of carbon dioxide and the heat of precipitation of bicarbonate do not affect the amount of acid gas absorption due to temperature effects on mass transfer, and wherein the isothermal temperature is selected based on the concentration of the alkali carbonate in the solvent stream and the required acid gas absorption;
- c) heating the loaded stream so as to regenerate alkali bicarbonate in the precipitant and the liquid phase and form i) a regenerated stream containing alkali carbonate, ii) a gas stream that is rich in carbon dioxide and iii) an intermediate stream that is lean in bicarbonate and contains sulphur and/or nitrogen compounds in solution;
- d) recovering from the intermediate stream, that is rich in alkali carbonate, either one or both of sulphur containing compounds or nitrogen containing compounds to form a lean stream, in which the alkali sulphate and nitrate content of the intermediate stream is in the range of 0.6 to 0.8% weight, and wherein step d) includes recovering either one or a combination of sulphur containing compounds or nitrogen containing compounds by selective sorption using at least one ion exchange resin; and
- e) recycling a recycle stream that includes the regenerated stream of alkali carbonate and the lean stream for reuse in the solvent solution of step a, in which the recycle stream is lean in bicarbonate and has a carbon dioxide loading in the range of 0.2 to 0.3;

wherein step c) includes heating the alkali bicarbonate using an auxiliary heating source that is separate from power plant operations, the auxiliary heating source involving the combustion of fossil fuels, and flue gas produced by the auxiliary heating source forms a part of the gas stream contacted with the solvent in step a); and wherein the solvent solution is without a promoter, activator or catalyst, wherein step c) includes transferring heat from the regenerated stream to the loaded stream wherein the process includes storing the bicarbonate in precipitant form during periods of high demand for electrical energy and regenerating stored bicarbonate according to step b) by using the surplus heat from a power plant during period of lower demand for electrical energy, and wherein the solvent solution stream is without a promoter, activator or catalyst to enhance absorption of acid gases from the gas stream.

* * * * *